(12) United States Patent
Papadogiannis et al.

(10) Patent No.: US 9,161,289 B2
(45) Date of Patent: Oct. 13, 2015

(54) SELECTION OF DYNAMIC RELAYS FOR COOPERATIVE COMMUNICATIONS IN A MOBILE NETWORK

(75) Inventors: Agisilaos Papadogiannis, Gothenburg (SE); Eric Hardouin, Paris (FR); Ahmed Saadani, Issy les Moulineaux (FR)

(73) Assignee: Orange, Paris (FR)

( * ) Notice: Subject to any disclaimer, the term of this patent is extended or adjusted under 35 U.S.C. 154(b) by 277 days.

(21) Appl. No.: 13/384,455

(22) PCT Filed: Jul. 8, 2010

(86) PCT No.: PCT/FR2010/051449
§ 371 (c)(1),
(2), (4) Date: Jun. 20, 2012

(87) PCT Pub. No.: WO2011/007085
PCT Pub. Date: Jan. 20, 2011

(65) Prior Publication Data
US 2012/0250545 A1 Oct. 4, 2012

(30) Foreign Application Priority Data
Jul. 17, 2009 (FR) ........................ 09 54961

(51) Int. Cl.
*H04W 40/12* (2009.01)
*H04W 88/04* (2009.01)

(52) U.S. Cl.
CPC .............. *H04W 40/12* (2013.01); *H04W 88/04* (2013.01)

(58) Field of Classification Search
CPC ............................... H04W 40/12; H04W 88/04
See application file for complete search history.

(56) References Cited

U.S. PATENT DOCUMENTS

| 7,184,703 | B1* | 2/2007 | Naden et al. ............ 455/10 |
| 2007/0165581 | A1 | 7/2007 | Mehta et al. |
| 2007/0280172 | A1* | 12/2007 | Tan et al. .............. 370/335 |
| 2008/0285502 | A1* | 11/2008 | Deng et al. ............ 370/315 |
| 2009/0227258 | A1* | 9/2009 | Youn et al. ............ 455/445 |
| 2010/0039947 | A1* | 2/2010 | Li et al. ............... 370/252 |
| 2010/0210238 | A1* | 8/2010 | Cho et al. ............. 455/406 |
| 2013/0010677 | A1* | 1/2013 | Youn et al. ............ 370/315 |

OTHER PUBLICATIONS

Ban et al., "Performance Analysis of Two Relay Selection Schemes for Cooperative Diversity," The 18th Annual IEEE International Symposium on Personal, Indoor and Mobile Radio Communications (PIMRC'07), IEEE, pp. 1-5 (Sep. 1, 2007).
Bletsas et al., "A Simple Cooperative Diversity Method Based on Network Path Selection," IEEE Journal on Selected Areas in Communications, vol. 24(3), pp. 659-672 (Mar. 2006).
Ibrahim et al., "Cooperative Communications with Relay-Selection: When to Cooperate and Whom to Cooperate With?" IEEE Transactions on Wireless Communications, IEEE Service Center, Piscataway, NJ, US, vol. 7(7), pp. 2814-2827 (Jul. 1, 2008).

(Continued)

*Primary Examiner* — Jason Mattis
(74) *Attorney, Agent, or Firm* — Drinker Biddle & Reath LLP

(57) ABSTRACT

The invention relates to the selection of at least one dynamic node, in a mobile network, as a candidate for relaying a data communication signal between a transmitting entity and a receiving entity of the network. In terms of the invention: at least one first area around at least one first entity among the transmitting and receiving entities is defined, beyond which a data communication signal is attenuated beyond a first predetermined threshold; and the selection of nodes as possible candidates for relaying the communication signal on the basis of the definition of the first area is limited.

13 Claims, 6 Drawing Sheets

(56) References Cited

OTHER PUBLICATIONS

Luo et al., "Link-Failure Probabilities for Practical Cooperative Relay Networks," 2005 IEEE 61st Vehicular Technology Conference, 2005, VTC 2005—Spring, IEEE, Piscataway, NJ, US, vol. 3, pp. 1489-1493 (May 30, 2005).

Nam et al., "Relay Selection Methods for Wireless Cooperative Communications," 42nd Annual Conference on Information Sciences and Systems, 2008, CISS 2008, IEEE, Piscataway, NJ, US, pp. 859-864 (Mar. 19, 2008).

Sreng et al., "Relayer Selection Strategies in Cellular Networks with Peer-to-Peer Relaying," 2003 IEEE 58th Vehicular Technology Conference, 2003, VTC 2003-Fall, Orlando, FL, US, Piscataway, NJ, US, IEEE, vo. 3, pp. 1949-1953 (Oct. 6, 2003).

Sreng, "Coverage Enhancement Through Two-hop Relaying in Cellular Radio Systems," Thesis, pp. 24-39 (Jan. 1, 2002).

Zorzi, et al., "Geographic Random Forwarding (GeRaF) for Ad Hoc and Sensor Networks: Multihop Performance," IEEE Transactions on Mobile Computing, vol. 2 (4), pp. 337-347 (Oct.-Dec. 2003).

* cited by examiner

SELECTION OF DYNAMIC RELAYS FOR COOPERATIVE COMMUNICATIONS IN A MOBILE NETWORK

CROSS-REFERENCE TO RELATED APPLICATIONS

This application is the U.S. national phase of the International Patent Application No. PCT/FR2010/051449 filed Jul. 8, 2010, which claims the benefit of French Application No. 09 54961 filed Jul. 17, 2009, the entire content of which is incorporated herein by reference.

FIELD OF THE INVENTION

The invention relates to the field of telecommunications, notably wireless radio-communications with mobile terminals.

BACKGROUND

It is more particularly related to an implementation of cooperative communications making use of dynamic relays in a mobile network, notably a cellular network in which base stations have a radio coverage over respective cells of the network. With reference to FIG. 1 illustrating the situation of a cellular network, a cooperative communication denotes a transmission technique where:
  in downlink mode DL, terminals TER receive useful signal from a base station BS via other terminals REL1 (one or more) which relay the useful signal transmitted by the base station BS, and
  in uplink mode UL the base station BS receives useful signal coming from a transmitter terminal TER via other terminals REL2 (one or more) which relay the transmitted signal to the base station.

For clarity of presentation in FIG. 1, only the links via relays REL1, REL2 are shown. In practice, however, the same signals can be transmitted via various paths:
  via relays (as shown in FIG. 1), and
  directly between the base station BS and the terminal TER.

With for example two signals carrying the same information and coming from different nodes of the network (coming for example directly from the base station, on the one hand, and from one or more relays, on the other), this diversity of communication "paths" taken allows the signal-to-noise ratio on reception of the signals to be improved.

Cooperative communications in a cellular network allow the terminals (or the base stations, respectively) to receive useful signal from the base station (or from the terminals, respectively) and also from other nodes of the network (typically relay nodes) which relay the useful signal.

A transmission that makes use of the relay nodes must use a relay protocol. The most well known relay protocols are:
  the protocol "Amplify-and-Forward" (AT), according to which the relay amplifies the signal that it receives and retransmits the signal thus amplified, and
  the protocol "Decode-and-Forward" (DT), according to which the relay decodes the signal received before retransmitting the signal, which allows the noise initially present in the received signal to be eliminated.

The relay nodes in a cellular network may be static or dynamic. Static relay nodes belong to the infrastructure of the network and they are deployed in particular chosen points of the cell. Dynamic relays are generally mobile nodes which can for example be terminals that are situated within a given cell and which behave as relay nodes by assisting the transmission toward one destination (or more), where this destination can be a terminal ("downlink" case) or a base station ("uplink" case).

Cooperative communications (use of the relay nodes) within a cellular network can increase the coverage of the cell, improve the reception of the signals (by offering a gain in diversity for example) and increase the spectral efficiency of the network (which is defined in bits per second, per Hertz and per cell). The easiest way of making use of relays is simply to deploy a few static relays at particular points of the cell. This practice makes the selection of the relays, for a particular transmission, reasonably easy because the potential relays are limited.

The selection of the relays participating in a particular transmission is obligatory in a system where many relays (either static or dynamic) may exist. The most relevant relays and those truly providing a gain in performance when they assist a transmission must therefore be chosen. Furthermore, it could be that, in certain situations, it is impossible to find relevant relays, such that the direct transmission between the source and the destination must be imposed. Moreover, if static relays are deployed, the points of deployment of the relays may be chosen so as to guarantee a sound link between the relays and the base stations, which can enhance the efficiency of the relay operation.

However, the deployment of the static relays increases the cost of the systems because it requires other infrastructure elements (relay nodes) to be added. In contrast, the implementation of dynamic relays does not require an additional infrastructure cost. The user terminals available in a cell can relay signals in order to assist the transmission to other terminals. Dynamic relays may be applied both in the downlink direction and in the uplink direction. Nevertheless, the use of dynamic relays poses problems of complexity and of loading on the return channel. The return channel denotes a transmission from the terminal to the base station intended to supply control information on the terminal to the base station, such as for example the quality of its channel.

The information transmitted over the return channel represents a loss of spectral efficiency for the system, since it occupies radio resources which cannot be used for the transmission of useful signals. Indeed, in order to select the relay (or relays) to ensure the transmission to a destination, the base station (an entity that usually takes such decisions in a cellular system) must acquire information on the state of the transmission channels (or "CSI" for "Channel State Information") between the source and the potential relays, and also between the potential relays and the destination. The CSI information may for example consist of channel transmission coefficients or of other, more concise, information on the quality of the channel, such as for example the gain of the channel or a signal-to-interference and signal-to-noise ratio, or other types.

Hereinafter, "gain of the channel" will be understood to mean the ratio between the power received at the receiver antennas and the power emitted by the transmission antennas. This gain depends:
  on the propagation losses (or "pathloss"), which increase with the distance between a transmitter node and a receiver node,
  on the "shadowing" effect,
  and also on the "fast fading" of the channel.

Hereinafter, "attenuation" is also understood to mean the cumulative effect of the pathloss and of the "shadowing" effect; in practice, the attenuation can be estimated for example by the inverse of the gain of the channel (and then depends on the fast fading). By estimating an average of the inverse of the channel gain over several successive values, the dependency of the estimated attenuation on the fast fading can be reduced.

The transmission of the information on the state of the transmission channels CSI increases the load on the return channel, together with the complexity of the process of selection of the relays. This is because the load on the return channel and the complexity of the selection process are proportional to the number of candidate terminals for the relay operation. No technique is currently known for reducing the number of potential relays capable of assisting the transmission to a terminal or a base station. Thus, the number of candidate relay nodes for a particular transmission is not currently reduced and the complexity of the selection, together with the load on the return channel, makes the relay operation difficult in a cellular network.

In the framework of ad-hoc networks employing multihop transmission, a technique has been developed for the selection of relay nodes in:

"*Geographic Random Forwarding (GeRaF) for Ad Hoc and Sensor Networks: Multihop Performance*", M. Zorzi and R. R. Rao, IEEE Transactions on Mobile Computing, Vol. 2, No. 4, Pages 337-348 (October-December 2003).

According to this technique, the node transmitting data ("source node") knows its geographical coordinates and the coordinates of the node that wants to receive the message from the source ("destination node"). The source transmits a packet which contains its coordinates and the coordinates of the destination node. All the nodes that receive the packet estimate their distance to the source and to the destination, basing this on the received coordinates. The nodes that are closer to the destination than the source become candidates for the relay operation. In order to define the relay, a priority level is assigned to each candidate node according to their proximity to the destination, and the node having the highest priority (the closest to the destination) is finally selected. This technique is targeted for ad-hoc networks and does not take into account the shadowing effect, which is however essential for cellular networks, nor the fast fading of the channel. Moreover, this technique requires the nodes to use a receiver of the GPS (for "Global Positioning System") type in order to estimate their geographical coordinates, a fact which increases the cost of the system.

One technique for the selection of the best relay between a source and a destination based on the quality of the instantaneous source-relay and relay-destination channels has been developed in:

"*A Simple Cooperative Diversity Method Based on Network Path Selection*", A. Bletsas, A. Khisti, D. P. Reed and A. Lippman, IEEE Journal on Selected Areas in Communications, Vol. 24, No. 3, Pages 659-672 (March 2006).

In this technique, a source sends an RTS packet (called "Ready-To-Send" in this document) and all the nodes in the neighborhood estimate the gain of the channel between the source and themselves. This packet is detected by the destination node that sends a CTS ("Clear-To-Send") packet, which allows the nodes in the neighborhood to estimate the gain of the channel between the destination and themselves. After the reception of the CTS packet, the potential relays trigger a timer that expires depending on the current quality of the two channels (source-relay and relay-destination). Thus, the relay that has the timer which expires the fastest is the best relay and it sends a flag packet. This flag packet is then detected by other candidate relays which stop their timers.

This particular technique does not take into account the structure of the cellular networks that may be exploited to simplify the relay selection method.

The techniques developed by Zorzi et al (2003) and Bletsas et al (2006), which are really designed for ad-hoc networks, are therefore based on the principle that the transmission between the source and the destination is always assisted by a relay node (where potential relays exist). However, the use of a relay does not always increase the capacity of the transmission. Accordingly, in a real system, a relay must be used only if it truly enhances the performance of the transmission.

The performance of the transmission can be estimated for example on the basis of a capacity of the transmission making use of a particular relay, where the capacity of the transmission can then be a performance criterion. "Capacity of the transmission" is taken to mean, depending on the chosen metric, the data rate offered for the transmission, or its quality of service (or "QoS"), or again its signal-to-noise ratio, or any other criteria of this type. It should then be pointed out that, for example for the criteria on data rate offered, a relay results in a loss of resource, in terms of resource allocation time interval (or "TTI" for "transmission time interval"), which decreases the total data rate of the system.

For example, for a transmission in "half-duplex" mode (since the relay does not transmit simultaneously in uplink and in downlink mode), the use of a relay requires two transmission time intervals ("TTI"):

one for transmitting from the source to the relay, and
the other for transmitting from the relay to the destination.

The period TTI is conventionally the elementary interval of time during which radio resources can be allocated to a terminal. Therefore, the capacity of a transmission attained with the aid of a relay node is divided by a factor of two in the "half-duplex" mode of operation. Thus, the performance of the relay operation in "half-duplex" mode is limited by this factor. As a result, in all the modes of operation (half-duplex or full-duplex), if the transmission via a relay node does not truly increase the capacity of the transmission, the relay operation is counter-productive.

SUMMARY

The present invention is aimed at improving this situation.

For this purpose, it first of all provides a selection method for at least one dynamic node, within a mobile network, as a candidate for relaying a data communication signal between a transmitter entity and a receiver entity of the network.

The method comprises the steps:
determine at least one first set of nodes of the network such that a signal communicated between one of the nodes of the first set and at least a first entity, from between said transmitter and receiver entities, undergoes an attenuation lower than a first predetermined threshold, and
limit the selection of nodes as possible candidates for relaying the communication signal according to the content of this first set.

Thus, the idea of the present invention is to take into account the effect of attenuation in the communication of the signals between the transmitter and receiver entities, on the one hand, and the nodes of the network, on the other, by comparison with predetermined thresholds, in order to establish a pre-selection of the nodes capable of playing the role of relay and to eliminate from this pre-selection the nodes that can be ignored. As an initial step, the attenuation of a signal communicated between the transmitter and receiver entities can already be taken into account in order to determine if the use of a relay is really necessary or if a direct communication between the transmitter and receiver entities can be the decision.

Thus, this pre-selection of the nodes capable of serving as the relay, and above all the elimination of the nodes that are not selected as candidates according to the aforementioned attenuation criteria, allows a lightening of the definitive method for selection of the nodes, such as was known in the prior art where all the nodes were selected a priori as possible candidates for the relay. According to the invention, some of the nodes are eliminated from the start if they do not comply with certain particular conditions for their attenuation with respect to a threshold.

Several embodiments are envisioned, as variants or as complements, for the limitation of the candidate nodes.

In one advantageous embodiment notably in the case of a cellular network, it may for example be decided that the terminals of the cell situated in a first region around the base station (for example the region Z1 corresponding to a disk of radius R1 in FIG. 2A described hereinafter), in which the attenuation is lower than a given threshold, do not need a relay for communicating with the base station. Accordingly, it is then possible to decide on a direct transmission between the base station and such terminals.

In the known prior art (Zorzi et at (2003) or Bletsas et at (2006)), the fact is not taken into account that, in a cellular system, the base stations have directive antennas greatly improving the transmission and the reception of the signals (by concentrating the transmission and the reception in a given direction). It is therefore very probable that the terminals close to the base station have a high channel gain toward the base station, hence not requiring the use of a relay to assist their transmission. Thus, in the embodiment of the invention described hereinabove with reference to FIG. 2A, it is already possible to limit the use of relays to only assisting the terminals that are far enough from the base station (terminal TER1 in FIG. 2A), which allows the load on the return channel to be significantly reduced. It is indeed recalled that, in a cellular system, the entity able to take the decisions on the relay operation is the base station. Consequently, the base station needs to acquire information linked to the channels (referred to as "CSI") not only between the terminals, but furthermore between the base station itself and the terminals, thus leading to an overload on the return channel.

As a complement or a variant, a region should be bounded around the terminal, or more generally around a transmitter or receiver entity of a mobile network (not necessarily cellular), beyond which the attenuation is such that it becomes necessary to make use of a relay. The relay nodes, or at least the first relay node (on the terminal side), must then be situated within this region.

Indeed, in the known prior art (Zorzi et at (2003) or Bletsas et at (2006)), all the nodes of the system receiving the relevant signaling packets, for choosing the best relay node, participate in the selection method. In a cellular system where a transmission making use of the relays is authorized, it is not efficient to consider as possible relays all the other terminals of the cell capable of receiving the corresponding signaling packets (notably RTS, CTS or other packets, described hereinbelow), because this approach increases the complexity of the selection. In order to take into account the antenna gain of the base station, a satisfactory relay is, in fact, closer to the terminal (source or destination) than to the base station. Accordingly, these observations are advantageously exploited according to the invention so as to better design the method for selection of the relays, by reducing the load on the return channel and the consumption of radio resources associated with this load.

Thus, in more generic terms, one embodiment of the method according to the invention overcomes these problems and preferably comprises the steps:

determine an intersection between the first set and a second set of nodes such that a signal communicated between a node of this second set and the second entity, from between said transmitter and receiver entities, undergoes an attenuation lower than a threshold corresponding to a signal attenuation between the transmitter entity and the receiver entity, and limit the selection of nodes as possible candidates for relaying the communication signal to the nodes of said intersection.

It will therefore be understood that, by again using a representation by attenuation region as illustrated in FIG. 2B, the nodes situated beyond an intersection region RI between the two attenuation regions with respective radii R2 (which is an increasing function of the aforementioned first threshold) and RIS (which is a function of the attenuation between the transmitter and receiver entities TER and BS) are not candidates, at least for being the first relay (on the transmitter or receiver entity side), and can therefore be eliminated from a pre-selection, which then avoids an overloading of the network.

In the examples in FIGS. 2A and 2B, simply by way of illustration, it is considered that the attenuation of a signal communicated between two entities (for example, between the base station BS and the terminal TER in FIG. 2B) is an increasing function of the distance (in the same example, the distance RIS) separating these two entities. The regions shown in these figures can then approximately take the form of disks with radii that are functions of the attenuation. FIGS. 2A and 2B and the determination of these regions are described in detail hereinafter.

In a situation of relays between several entities (referred to as "multihop"), it is possible to extend the steps of the method from one to the next in order to define a succession of intersection regions from the first entity (which is then a source node) as far as the second entity (which is then a destination node).

In one embodiment of the invention, where the mobile network is a cellular network comprising base stations serving terminals within cells of the network and the relay nodes are chosen from amongst these terminals, the aforementioned first entity and second entity are terminals. In particular, one of the aforementioned transmitter and receiver entities is defined as first entity if a signal communicated between this entity and the base station undergoes a lower attenuation than a signal communicated between the other entity and the base station. This feature can be illustrated in FIGS. 3 and 4 by the fact that the first entity is closer to the base station than the second entity. This choice is justified in detail in the exemplary embodiments described hereinafter. It goes without saying that this situation is just as applicable to a multihop situation, with a transmission of the communication signal via several relay nodes, as to a communication between two terminals with no multihop situation, but simply via a single relay.

In the case where use is made of a first relay (base station side or terminal side which transmits or to which is sent the data communication signal), the aforementioned first entity is the terminal and the second entity is the base station, both for downlink mode and for uplink mode, as will be seen in the exemplary embodiments detailed hereinafter.

Thus, in more generic terms, the first entity is a terminal and the second entity is a base station, in both of the two cases where:

the data communication signal is transmitted from the base station and to the terminal, and the data communication signal is transmitted from the terminal and to the base station.

As previously indicated, in one embodiment, (as a complement or as a variant of a bounding of an intersection region) a region around the base station is bounded for firstly determining whether or not it is necessary to make use of a relay in order to serve a terminal in uplink mode or in downlink mode.

Thus, in more generic terms, the method comprises, in this embodiment, the steps:

determine an attenuation that a signal communicated between the terminal and the base station undergoes, and if the attenuation of said signal between the terminal and the base station is lower than a second predetermined threshold, decide on a direct transmission of the communication signal between the base station and the terminal, without making use of a relay.

The first threshold and/or the second threshold are preferably lower than the attenuation that a signal communicated directly between the transmitter and receiver entities undergoes. Indeed, in order to be advantageous, the limitation on the candidate nodes for the relay is preferably determined in relation to regions covering a smaller range than the distance between the transmitter and receiver entities (for example disks with radii R1 (FIG. 2A) and R2 (FIG. 2B), with respect to the distance RIS).

In practice, the aforementioned first and second thresholds may be determined by prior simulations and/or by measurements on the network. They may be functions for example of the number of terminals per cell (decreasing functions), and/or of an interference between cells (increasing functions). The intercellular interference typically depends on the transmission power of cells around the cell in question, on the dimensions of the cell in question and on the number of cells distributed around the cell in question. By way of example that is purely illustrative, a cell with a 1000 m radius is considered and within which thirty terminals are located. This cell is surrounded by 18 cells in its neighborhood with identical transmission powers of 60 W for all the base stations of these cells. In the example, these base stations are equipped with omnidirectional antennas whose antenna gain is 9 dB. In this example, the following choices have then yielded satisfactory results:

a first attenuation threshold such that the radius R2 of the region Z2 in FIG. 2B is 500 m and a second attenuation threshold such that the radius R1 of the region Z1 in FIG. 2A is 500 m.

Preferably, in order to select the best relay from amongst the candidate nodes, the terminals uplink, to the base stations serving their cell, information on a channel gain (with the other terminals of the cell and/or with the base station), and/or information on an intercellular interference and noise. The base station then decides to fix at least one terminal as a relay node from amongst the nodes of the aforementioned intersection of sets, depending on the information uplinked by the terminals.

In one advantageous embodiment, the base station determines a sub-set comprising at least one terminal as relay node supplying an optimum gain in transmission capacity, estimated as a function of said information that the terminals uplink. "Capacity of the transmission", is taken to mean the data rate offered for the transmission, or the quality of service that the transmission provides, or again its signal-to-noise ratio, or any other criterion measuring the quality of the transmission using the chosen relay.

This embodiment, while being advantageous, nevertheless does allow variants. For example, it is possible to make use of all the terminals simultaneously from the intersection of sets (corresponding to the region RI in FIG. 2B) to play the role of relays. In this case, the relays can operate in synchronized mode, by making use for example of distributed spatio-temporal codes or of a suitable formation of distributed beams (a technique referred to as "beamforming"), as will be seen hereinbelow.

More generally, in order to determine the potential relays within a mobile network (cellular or otherwise), the nodes of the network preferably transmit, to the transmitter entity and/or to the receiver entity, a test signal containing information allowing a signal attenuation respectively toward the transmitter entity and/or toward the receiver entity to be deduced. This test signal may contain for example packets of the RTS for "Ready-To-Send" or CTS for "Clear-To-Send" type, as will be seen hereinbelow.

The calculation of the first and/or of the second threshold, the processing of the information on attenuation that the nodes communicate and the determination of the candidate nodes can form the object of a computer program. In this respect, the present invention is also aimed at a computer program comprising instructions for the implementation of the method hereinabove, when this program is executed by a processor.

Such a program can be installed, for example, in a memory of a base station of a cellular network, or else in memories of the terminals for determining the candidate relays in their neighborhood.

The present invention is also aimed at a base station of a cellular network, comprising means for selection of at least one dynamic node of the network as candidate for relaying a data communication signal between the base station and a terminal of the network. These selection means are then configured for:

determining at least a first set of terminals such that a signal communicated between the base station and a terminal of the first set undergoes an attenuation lower than a first predetermined threshold, and limiting the selection of terminals as possible candidates for relaying the communication signal according to the content of said first set.

This first threshold can, for example, be for the base station, the threshold below which the decision is a direct transmission, without the use of a relay.

The present invention is also aimed at a terminal designed to transmit/receive a data communication signal within a mobile network, comprising means for selection of at least one dynamic node of the network as candidate for relaying the data communication signal between the terminal and an entity of the network. These selection means are configured for:

determining at least a first set of nodes of the network such that a signal communicated between the terminal and a node of the first set undergoes an attenuation lower than a first predetermined threshold, and limiting the selection of nodes as possible candidates for relaying the communication signal according to the content of said first set.

This first threshold may for example be, for the terminal, one of the thresholds allowing the aforementioned intersection of sets to be determined within which the candidate nodes for the relay are located.

Of course, the aforementioned means for selection of the dynamic nodes as candidates for relaying a signal between the terminal and the base station can be shared between the base station and the terminal (the terminal carrying out for example at least the determination of the attenuation around it and the base station also carrying out at least the determination of the attenuation around it). The present invention is then aimed at a system comprising at least one terminal and one base station, designed for a cellular network and globally comprising such selection means, configured for:
  determining at least a first set of nodes of the network such that a signal communicated between a node of the first set and at least an entity amongst the terminal and the base station undergoes an attenuation lower than a first predetermined threshold, and
  limiting the selection of nodes as possible candidates for relaying the communication signal according to the content of said first set.

BRIEF DESCRIPTION OF THE DRAWINGS

Other features and advantages of the invention will become apparent upon examining the description detailed hereinafter, and the appended drawings in which.

DETAILED DESCRIPTION

Figure 1:
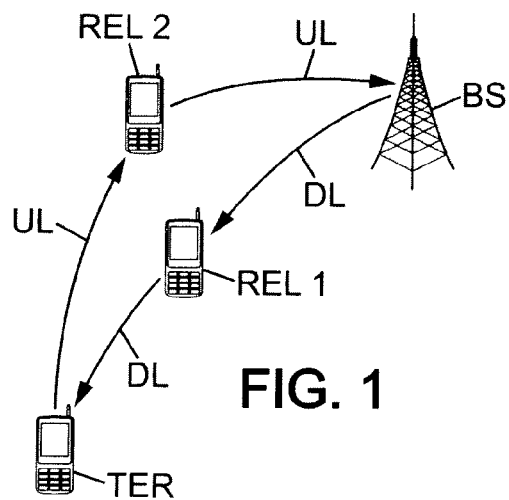
FIG. 1 illustrates a cellular network with terminals serving as relays.

Hereinafter, by way of example, one implementation of the invention in a cellular network is described, that allows cooperative dynamic communications to be organized (by defining relays provided by terminals), in particular by minimizing the load on the return channel and the complexity associated with the selection of the best relay nodes.

For the transmission to a terminal or coming from a terminal, the number of potential relays is limited thanks to the implementation of the invention, and, consequently, the load on the return channel is advantageously limited.

In the exemplary embodiment, the terminals of the cell can determine the attenuation of the signals communicated with the source and with the destination. The term "signals communicated" is taken to mean the signals transmitted by the terminals and received by the source or the destination, together with the signals received by the terminals and coming from the source or from the destination.

When the base stations have directive antennas which improve the transmission and the reception of the signals, it is pointless to relay signals from or to a terminal which is close to the base station. Thus, if the attenuation (which is a function of the distance and of the shadowing effect) from a terminal to the base station is lower than a threshold, the system is suitable for not making use of a relay node because it is very likely that direct transmission would reach a better capacity.

For the same reason, when a terminal is sufficiently far from the base station, the relay-terminal link is probably weaker than the base station-relay link, owing to the antenna gain of the base station. It is therefore more likely that a suitable relay will be identified closer to the terminal than to the base station. Thus, the terminals for which the attenuation toward the source terminal (in uplink mode) or destination (in downlink mode) is lower than another threshold (which amounts to considering the terminals as being inside of a coverage disk centered on the source or destination terminal according to the mode "uplink" or "downlink", as will be seen with reference to the figures hereinafter). Moreover, inside of this disk, nodes can be further away from the base station than the source or destination terminal. It is not very likely that these nodes are then capable of improving the transmission from or toward the target terminal, as a relay, because their attenuation toward the base station is higher than that of the target terminal. As a result, only the nodes inside of the disk and which are closer to the base station than the terminal to be served can be selected, which can further reduce the load on the return channel.

Embodiments for determining the selection of the potential relays from amongst all the nodes of the network, in order to improve the communication between the base station and the terminal to be served, are hereinafter described.

In downlink mode, the source node is the base station BS (transmitter entity) and the destination node is the terminal TER to be served within the cell (receiver entity). Two attenuation thresholds are preferably defined.

Figure 2A:
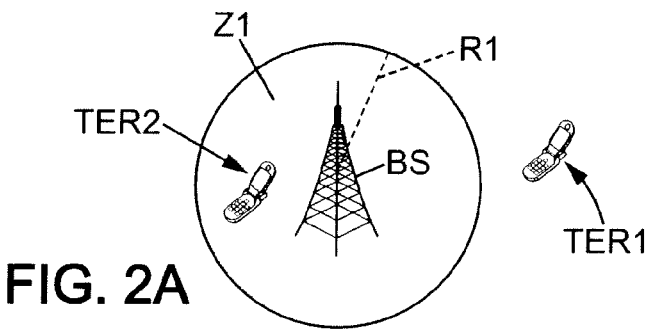
FIG. 2A illustrates schematically a situation where a direct transmission is the decision (between the base station BS and the terminal TER2) and a situation where the use of a relay is preferred (between the terminal TER1 and the base station BS)

With reference to FIG. 2A, a threshold dt1 is associated with the attenuation of a signal communicated between the source BS and the terminal to be served, then defining a region Z1 for direct transmission (without relay) between the base station and a terminal TER2 which would be situated within this region Z1. This region Z1 corresponds (as a first approximation and by way of illustration in FIG. 2A) to a disk whose center is the source (base station BS) and whose radius R1 is an increasing function of the threshold dt1: the higher the threshold chosen, the larger the radius of this region Z1. This is however an approximation because although the attenuation depends on the distance (owing to the propagation losses or "pathloss", expressed in decibels, according to a linear function of the logarithm of the distance), but also on the shadowing effects.

Figure 2B:
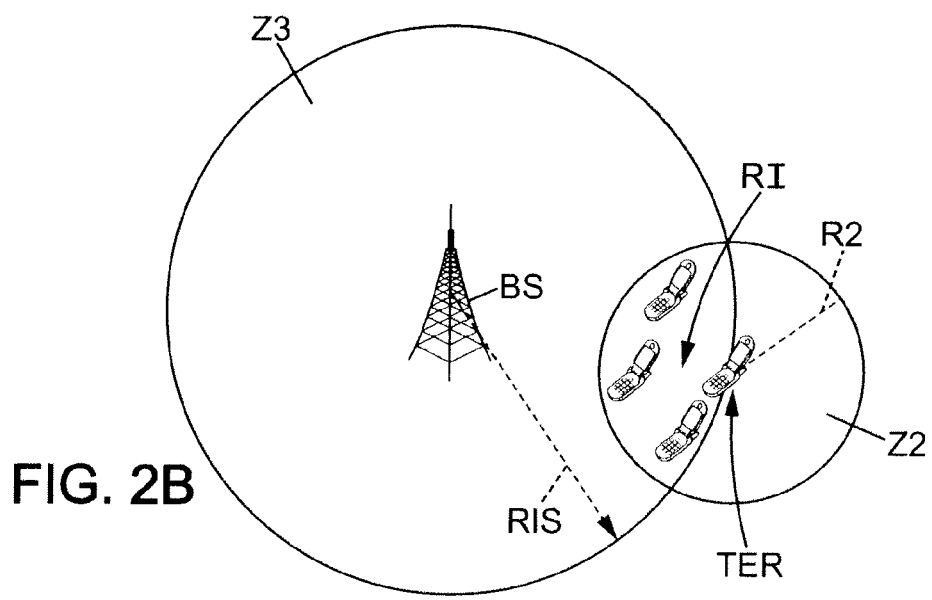
FIG. 2B illustrates schematically a region comprising possible candidate relays within a cellular network for a communication between a base station and a terminal.

The representation by disks of the sets of terminals to be considered in the FIGS. 2A and 2B is only given by way of example, for the clarity of the presentation. In a preferred embodiment, the practical implementation of the invention is essentially based on measurements of attenuations without particularly taking into account the position of the terminals with respect to the regions Z1 to Z3 shown in the figures.

In the example shown in FIG. 2A, the terminal TER2 is directly served by the base station BS, without the use of a relay. On the other hand, the use of at least one relay is preferred for serving the terminal TER1 which is situated outside of the region Z1, in other words a signal communicated between the base station and the terminal TER1 undergoes an attenuation higher than the threshold dt1.

With reference now to FIG. 2B, another threshold dt2 is associated with the attenuation toward the destination TER and then defines a region Z2 of possible transmission between the terminal TER and another terminal that can play the role of relay if it is situated within this region Z2. This region Z2 corresponds (as a first approximation and by way of illustration in FIG. 2B) to a disk whose center is the destination (terminal TER) and whose radius R2 is an increasing function of the threshold dt2.

The attenuation of a signal between the source BS and the destination TER is furthermore determined. This attenuation is a function of the distance RIS between the base station BS and the terminal TER, corresponding to the radius of the disk Z3 shown in FIGS. 2A, 2B, 3 and 4. A node becomes a candidate for the relay of a communication to the terminal TER, if:

the signal attenuation between the base station BS and the terminal TER is already higher than the threshold dt1; otherwise, no relay is needed, if the signal attenuation between the node examined and the destination TER is lower than the threshold dt2, and if the signal attenuation between the node examined and the source is lower than the signal attenuation between the destination and the source; the signal attenuation between the destination and the source is hereinafter denoted DIS.

Thus, if the terminal TER to be served is not in the region Z1 (and a relay is then needed), the candidate terminals for the relay are chosen within the intersection region RI in FIG. 2B.

For the relay operation itself, all or part of the nodes becoming candidates for the relay could be used for relaying the signal between the terminal and the destination. If more than two terminals are used for the relay at the same time, it is preferable to operate in synchronized manner (for example, with distributed spatio-temporal codes or by suitable formation of distributed beams according to a "beamforming" technique).

In one advantageous variant, the use of spatio-temporal or beamforming codes can be avoided and the nodes from the pre-selection are used one to one, individually. The terminal chosen for the relay, in this embodiment, is that which provides the best gain in performance according to a criterion being considered (transmission capacity for example). Indeed, the candidate nodes can uplink to the base station their channel gain with the source terminal and their intercellular interference power received plus noise. Then, the base station calculates the gain in performance that each terminal can allow to be attained by carrying out the relay and finally chooses the relay node that provides the best gain. A performance criterion that may be chosen is the transmission capacity. For example, a candidate node is finally chosen if the gain in capacity with the relay that it provides is better than the gain with a direct transmission (without relay).

The pre-selection of the relay in uplink mode is hereinafter described. The source node is now the terminal TER to be served and the destination node is the base station BS.

Here again, a node becomes a candidate for the relay:

if a relay is already needed (hence if the terminal is not in the region Z1), if the signal attenuation of the node examined toward the source TER is less than the threshold dt2 (in other words if the node examined is located within the region Z2 in FIG. 2B) and if the signal attenuation of the node examined toward the destination is lower than the attenuation of the source toward the destination (in other words if the node examined is located within the region Z3 as shown in FIG. 2B).

Finally, a relay is only required if the terminal TER is outside of the region Z1 around the base station BS, and a candidate terminal for the relay, in this case, is within the intersection region RI between the region Z2 and the region Z3.

For the relay, two options can still be chosen. All or part of the candidate nodes for the relay may be used for relaying signals to the destination, in a synchronized manner (with distributed spatio-temporal codes or by distributed beamforming).

As a variant, the terminal finally chosen as relay is that which provides the best gain in performance. The candidate nodes uplink to the base station their channel gain with the source terminal and their intercellular interference power received (plus noise). The base station subsequently calculates the gain in performance provided by each candidate relay. The base station chooses with highest priority the node that provides the best gain in performance for the relay.

Figure 3:
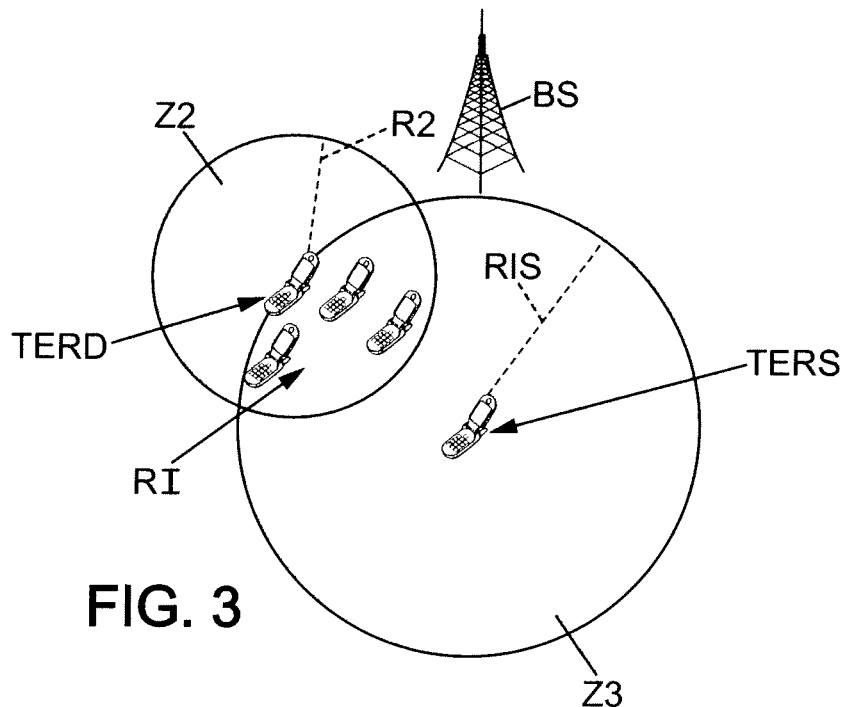
FIG. 3 illustrates schematically a region comprising possible candidate relays in a cellular network for a communication between two terminals.

Reference is now made to FIG. 3 for describing the case of a communication between two terminals (referred to as "device-to-device communication"), notably (but not necessarily) in a multihop situation. The source node TERS and the destination node TERD are terminals. The method described hereinbelow determines the pre-selection of the potential relays from amongst all the existing nodes of the network between these two terminals TERS and TERD.

The terminals that are closer to the base station BS receive less intercellular interference and can therefore provide a higher gain in performance if they relay signals. Two separate cases are differentiated by comparing:

the attenuation undergone by a signal communicated between the base station BS and the source terminal TERS, and the attenuation undergone by a signal communicated between the base station BS and the destination terminal TERD.

In a first case illustrated in FIG. 3, the attenuation between the base station BS and the destination TERD is smaller than the attenuation between the base station BS and the source TERS. This situation is illustrated in FIG. 3 by the fact that the destination TERD is closer to the base station, hence is more toward the center of the cell than the source. The destination TERD therefore receives less intercellular interference on average than the source TERS. In this case, a first disk Z2 whose center is the destination TERD and whose radius R2 is a function of the threshold dt2 (attenuation threshold of a signal communicated between a node being considered and the destination TERD) is defined. A second disk Z3 whose center is the source TERS and whose radius RIS is a function of the threshold DIS (attenuation between the source and the destination) is also defined. The candidate nodes for the relay are situated within the intersection region RI between these two regions Z2 and Z3.

Figure 4:
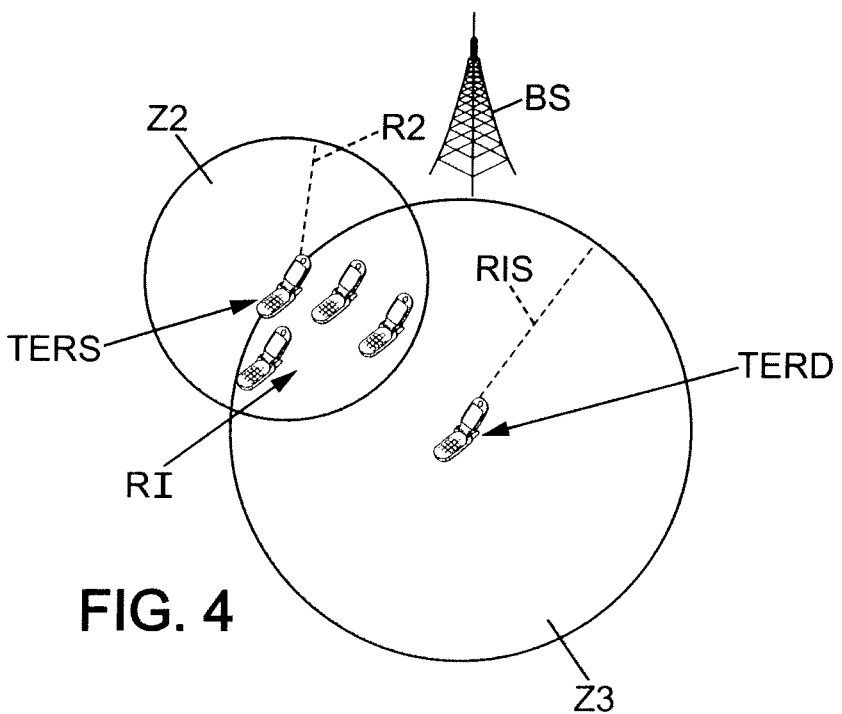
FIG. 4 illustrates schematically a region comprising possible candidate relays in a cellular network for a communication between two terminals, with a different terminal closer to the base station with respect to FIG. 3.

In a second case illustrated in FIG. 4, the attenuation between the base station BS and the source TERS is smaller than the attenuation between the base station BS and the destination TERD. In contrast to the preceding case, the source TERS is closer to the center of the cell than the destination TERD and receives less intercellular interference on average than the destination. The positions of the terminals TERS and TERD are simply to be considered as reversed between FIG. 3 and FIG. 4. In this second case, a first disk Z2 whose center is the source TERS and whose radius R2 is a function of the threshold dt2 (attenuation threshold from a signal communicated between a node being considered and the source TERS) is defined. A second disk Z3 whose center is the destination TERD and whose radius RIS is a function of the threshold DIS (attenuation between the source and the destination) is also defined. The candidate nodes for the relay are located within the intersection region RI between these two regions Z2 and Z3.

Thus, a node becomes a candidate for the relay operation if its attenuation toward the node closest to the center of the cell (source (FIG. 4) or destination (FIG. 3)) is less than the threshold dt2 (which means in other words that this node is in the disk Z2 of radius R2 being a function of the threshold dt2) and if its attenuation toward the source (FIG. 3) or toward the destination (FIG. 4) is lower than the attenuation of the source toward the destination DIS (which means in other words that it is also in the disk Z3 of radius RIS being a function of the threshold DIS).

Here again, there are two options to choose for the final choice of the relays. In a first option, the candidate nodes for the relay can all be used for relaying signals to the destination, in a synchronized manner. In a second option, the candidate node is firstly chosen that provides the best gain in performance, according to a given criterion, for relaying the signal transmitted by the source, the candidate nodes uplinking their channel gains and their intercellular interference power received (plus noise) to the base station.

The methods described hereinbelow relate to the transmission between a source and a destination in two hops. Nevertheless, more than two hops may be included in a cellular network (in "multihop" communications).

The following options can then be envisioned in "multihop" communications:
  a transmission in downlink mode for the first hop (from the base station BS to a relay) and a transmission from terminal to terminal assisted by at least one relay (therefore by at least two other hops) as illustrated in FIG. 4;
  a transmission from terminal to terminal assisted by at least one relay (hence by at least two firsts hops) as illustrated in FIG. 3, followed by a transmission in uplink mode (hence by an additional hop from a relay to the base station BS);
  a transmission between two terminals using several relays as illustrated in one of FIGS. 3 and 4.

Two exemplary embodiments and applications of the invention are hereinafter described. It goes without saying that a mixture of the two embodiments described could be implemented.

It is hereinafter assumed that the decisions on scheduling have already been taken (often by the base station) and in particular that a terminal is already chosen for transmitting or receiving data. It is assumed here that all the terminals are served in turn (scheduling according to an algorithm of the type referred to as "Round-Robin"). In a scheduling of this type, each terminal is served in turn; this can be carried out for example in the following manner: each terminal is identified by a single number and each base station forms a list of the terminals to be served in its region of coverage, this list being arranged for example in the order of increasing numbers of the terminals (this rule being able to be predefined in the definition of the base station parameters).

In the example described hereinafter, the situation is considered of a signal transmitted in downlink mode, the base station preparing to serve a particular terminal of index i potentially using a single relay in the example described.

Figure 5:
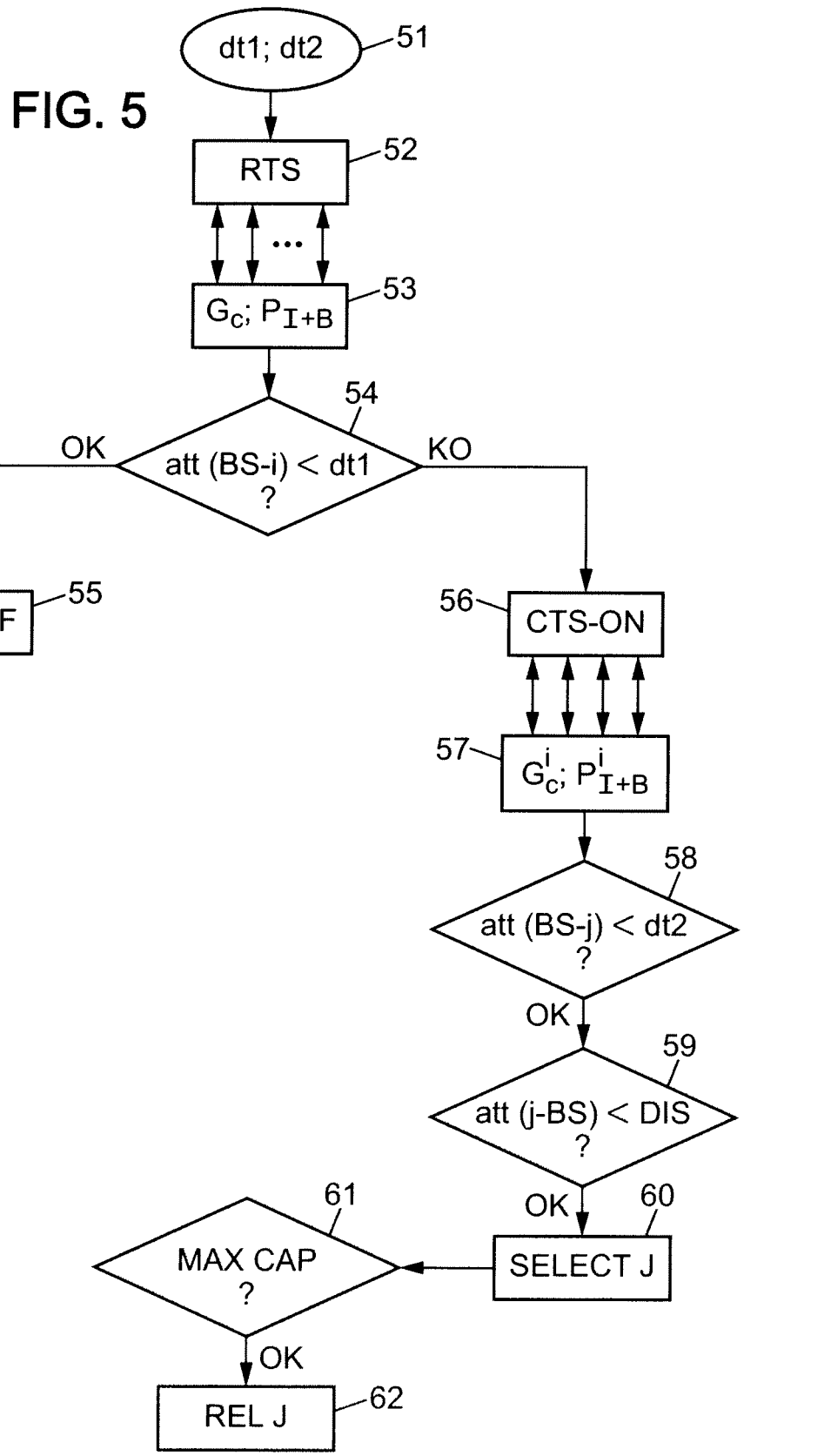
FIG. 5 is a flow diagram (that can illustrate the general algorithm of a computer program according to the invention in one exemplary embodiment) of the steps of a transmission in downlink mode according to a scheduling of the "round robin" type.

With reference to FIG. 5 defining the main steps of the method, the threshold dt1 for attenuation around the base station and the threshold dt2 for attenuation around the destination terminal (step 51) are defined (by simulation and/or by measurements in the cell).

In the step 52, the base station transmits an RTS ("Ready-To-Send") packet. This RTS packet contains control symbols.

The terminals of the cell detect the RTS packet and estimate the gain of their channel toward the base station with the aid of the control symbols. In one exemplary embodiment, the terminals deduce, from the gain of the channel, the corresponding attenuation. For example, the attenuation can be calculated by the inverse of the gain of the channel (and then takes into account the fast fading of the channel). If it is desired to overcome the rapid variations of the fast fading for a reliable estimation of the attenuation, the attenuation may for example be calculated by an average of the inverse of the current gain and of gain inverse values previously obtained and stored in a memory of the terminal (if these are available of course). In addition, the terminals estimate the intercellular interference power received plus the power of the noise (step 53).

If the attenuation between the base station BS and the destination (terminal i) is greater than the threshold dt1 (arrow KO at the output of the test 54), the destination i investigates the nodes likely to assist the transmission as a relay. Otherwise, the transmission is direct (arrow OK) at the step 55. In this latter case, the terminal i transmits a CTS/OFF ("clear-to-send" and "relay disabled": "OFF") packet: this packet indicates for the base station that the terminal i will receive data directly from the base station.

In the case of an indirect transmission, the terminal i transmits a CTS/ON ("clear-to-send", with relay enabled "ON") packet, which contains its attenuation, to the base station and control symbols (step 56). The terminals that can "hear" the CTS/ON packet estimate the gain of their channel toward the destination i and their intercellular interference power received plus the power of the noise (step 57).

For all the terminals j which have received the CTS/ON packet:
  if the attenuation from a terminal j toward the destination i is less than the threshold dt2 (arrow OK at the output of the test 58), and
  if the attenuation of the same terminal j toward the base station is lower than the attenuation DIS of the destination i to the base station (arrow OK at the output of the test 59),
this terminal becomes a potential relay (step 60).

It is pointed out that an RTS or CTS packet denotes a set of symbols which can be included in a wider radio packet, such as for example a sub-frame of the 3GPP LTE standard.

The potential relay uplinks to the base station its gain of the channel to the destination and its noise and intercellular interference power received.

The destination i uplinks to the base station its gain of the channel to the base station and its noise and intercellular interference power received.

The base station chooses (step 62) the best relay from amongst the nodes that have uplinked their channel gains toward the destination (potential relay nodes). The best relay is that which maximizes the capacity (test 61) according to the transmission protocol employed.

The chosen relay is used if the capacity with relay is greater than the direct transmission capacity. In this case, the chosen relay is informed by a flag packet.

The base station transmits data to the terminal i and the chosen relay assists the transmission in a satisfactory manner.

Figure 6:
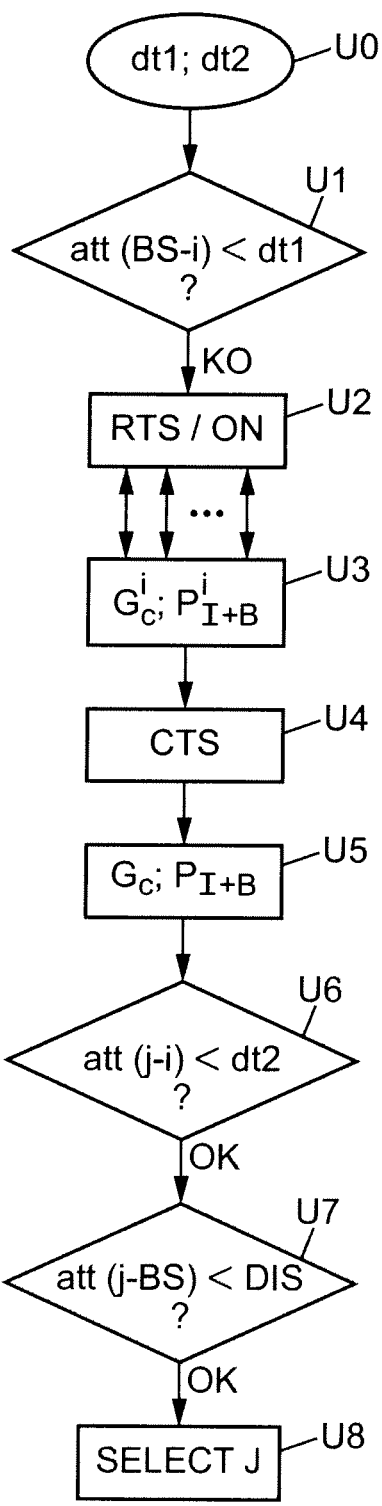
FIG. 6 is a flow diagram (that can illustrate the general algorithm of a computer program according to the invention in one exemplary embodiment) of the steps of a transmission in uplink mode according to a scheduling of the "round robin" type.

With reference to FIG. 6, in uplink mode, a source terminal i tries to transmit data to the base station (by considering in effect that the terminal i has been chosen for transmitting data to the base station).

A first attenuation threshold dt1 (attenuation to the base station) and a second attenuation threshold dt2 (attenuation to the source terminal) are defined, at the step U1.

If the attenuation between the terminal i and the base station is greater than the first threshold dt1 (arrow KO at the output of the test U1), the terminal i investigates potential relay nodes that may assist the transmission.

The terminal i transmits an RTS/ON ("ready-to-send" and relay "ON") packet which contains its attenuation to the base station and control symbols (step U2).

The terminals of the cell that receive the RTS/ON packet estimate the gain of their channel toward the terminal i, together with their noise and intercellular interference power received (step U3).

The base station transmits a packet CTS ("clear-to-send") which contains control symbols (step U4).

The terminals of the cell (the source i included) receive the CTS packet and estimate the gain of their channel to the base station, the corresponding attenuation, together with their noise and intercellular interference power received (step U5).

For all the terminals that have "heard" the RTS/ON packet, if the attenuation from a terminal toward the source i is less than the second threshold dt2 (test U6) and if the attenuation of the same terminal to the base station is lower than the attenuation of the source i to the base station (test U7), this terminal becomes a potential relay (step U8).

As previously described with reference to FIG. 5, the potential relay uplinks to the base station the gain of its channel, now toward the source i, together with its noise and intercellular interference power received. The source i uplinks the gain of its channel toward the base station and its noise and intercellular interference power to the base station. The base station chooses the best relay for the source i from amongst the nodes that have uplinked the gain of their channels. The best relay is that which maximizes the capacity of the transmission according to the transmission protocol employed.

A relay is selected if the capacity that it provides by acting as the relay is greater than the capacity of the direct transmission. In this case, the chosen relay is informed by a flag packet. The source transmits data and the chosen relay assists the transmission.

Once again, if the attenuation between the terminal i and the base station is smaller than the first threshold dt1, the source does not look for a potential relay node for assisting the transmission, because the source is then sufficiently close to the base station. The terminal i transmits an RTS/OFF ("ready-to-send" and relaying OFF) packet to indicate to the base station that the terminal i will transmit the data directly to the base station.

Hereinafter, another application of the invention is described with a different scheduling algorithm corresponding to the scheduling referred to as "max-SNR" (maximization of the signal-to-noise ratio). Here, the terminal served at each "TTI" period is that which has the best channel quality.

Figure 7:
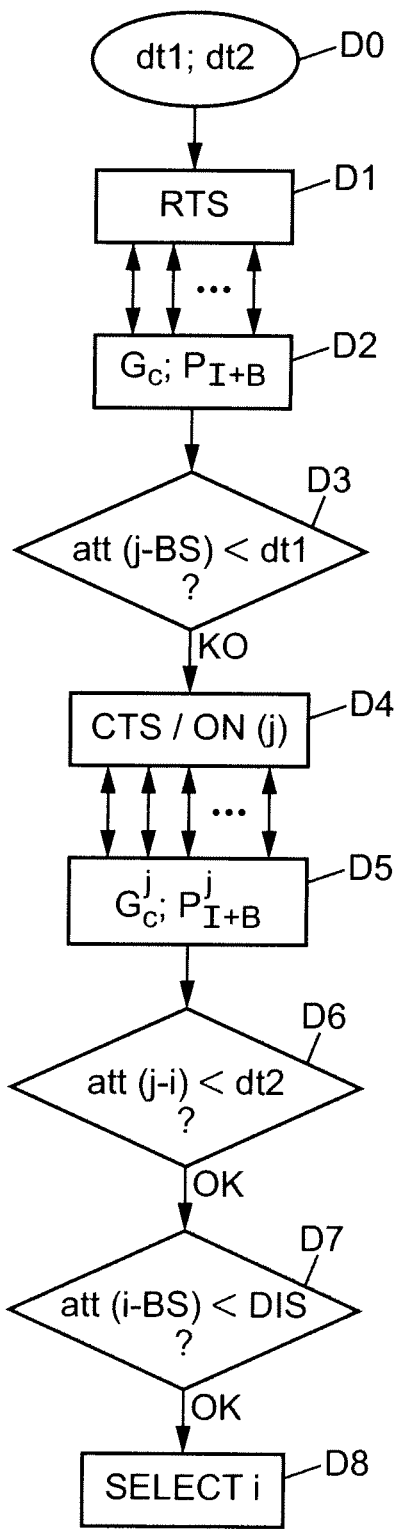
FIG. 7 is a flow diagram (that can illustrate the general algorithm of a computer program according to the invention in one exemplary embodiment) of the steps of a transmission in downlink mode according to a scheduling for maximizing the signal-to-noise ratio.
Figure 8:
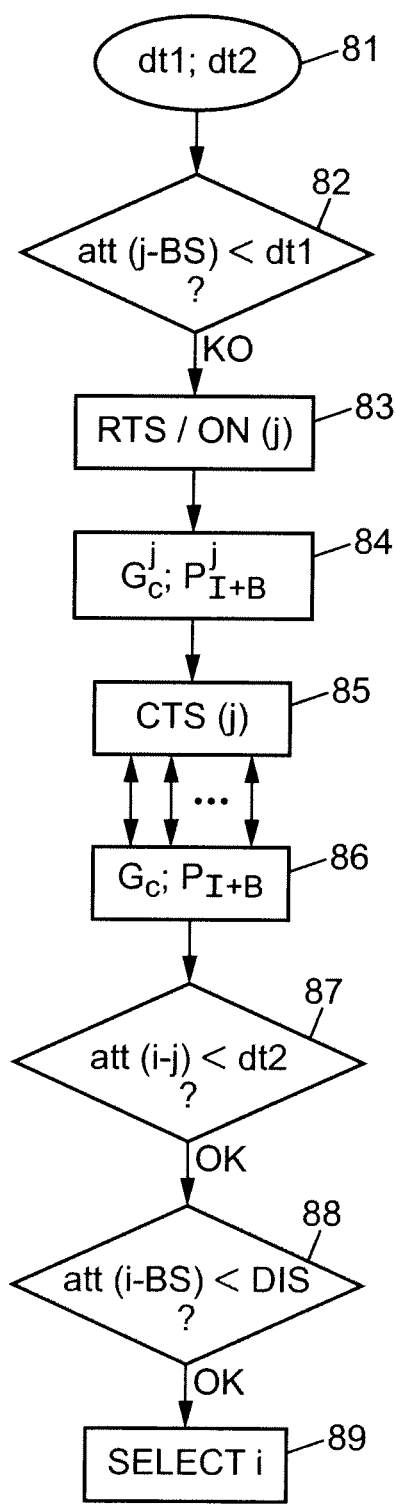
FIG. 8 is a flow diagram (that can illustrate the general algorithm of a computer program according to the invention in one exemplary embodiment) of the steps of a transmission in uplink mode according to a scheduling for maximizing the signal-to-noise ratio.

With reference to FIG. 7, in downlink mode, a first attenuation threshold dt1 (attenuation to the base station) and a second attenuation threshold dt2 (attenuation to the destination terminal) are defined (step D0). The base station transmits (in broadcast mode) an RTS ("ready-to-send") packet intended for each terminal j of the cell, this packet containing control symbols (step D1). Each terminal j of the cell detects the RTS packet and estimates the gain of its channel toward the base station, together with the corresponding attenuation. In addition, each terminal estimates its noise and intercellular interference power (step D2).

For each terminal j, if the attenuation between the base station and the terminal j is greater than the first threshold dt1 (arrow KO at the output of the test D3), the terminal j looks for potential relay nodes capable of relaying the transmission. The terminal j transmits a CTS/ON(j) (clear-to-send and relay ON) packet containing its attenuation toward the base station and control symbols (step D4). The terminals of the cell that can receive the CTS/ON packet from the terminal j estimate the gain of their channel toward the terminal j and their intercellular interference power received plus noise (step D5). For all the terminals that have received the CTS/ON(j) packet:
    if the attenuation from a terminal toward the terminal j is less than the second threshold dt2 (test D6) and
    if the attenuation of the same terminal to the base station is lower than the attenuation of the destination to the base station (test D7), this terminal becomes a potential relay (step D8).

The potential relay for the terminal j uplinks to the base station its gain of the channel to the destination and its intercellular interference power received plus noise. The terminal j uplinks to the base station its gain of the channel toward the base station and its intercellular interference power received plus noise. The base station chooses the best relay from amongst the nodes that have uplinked their channel gain toward the terminal j. The best relay for the terminals j is that which maximizes the capacity.

The base station calculates the capacity of the terminals j by taking into account their potential relays denoted "i". If a capacity obtained thanks to the relay operation for a given terminal j is greater than the capacity of the direct transmission (between the base station and the terminal to be served), then the capacity with relay is considered for this terminal j. Otherwise, the capacity considered for the terminal j is that of the direct transmission with the base station. Here, the base station preferably saves the estimated capacity for each terminal j (denoted C(j)) in memory.

If the attenuation between the base station and each terminal j is smaller than the first threshold dt1, the terminal j does not look for relay nodes capable of assisting the transmission and transmits a CTS/OFF(j) packet indicating to the base station and to other nodes in the neighborhood that the terminal j will receive the data directly from the base station. The capacity considered for the terminal j is then that of the direct transmission. The base station saves the capacity C(j) in memory.

The base station serves the terminal which has the best capacity from amongst all the terminals of the cell, where the transmission could be assisted by a relay which offers a better capacity than a direct transmission.

In uplink mode, in the scheduling algorithm max-SNR with relay, a first attenuation threshold dt1 (attenuation to the base station) and a second attenuation threshold dt2 (attenuation to the destination terminal) are defined (step 81).

If the attenuation between the terminal j and the base station is greater than the first threshold dt1 (arrow KO at the output of the test 82), the terminal j looks for potential relay nodes that may assist the transmission. The terminal j transmits a RTS/ON(j) packet containing its attenuation to the base station and control symbols (step 83). The terminals of the cell which receive the RTS/ON(j) packet estimate their channel gain toward the terminal j, the corresponding attenuation, together with their intercellular interference power received plus noise (step 84).

The base station transmits a CTS(j) packet containing control symbols for each terminal j (step 85). The terminals of the cell (terminal j included) receive the CTS packet and estimate their channel gain to the base station and their intercellular interference power received plus noise (step 86). For all the terminals i that have received the packet RTS/ON(j), if the attenuation from a terminal i toward the terminal j is less than the second threshold dt2 (test 87) and if the attenuation of the same terminal i to the base station is lower than the attenuation of the terminal j to the base station (test 88), this terminal becomes a potential relay (step 89).

The potential relay for the terminal j uplinks to the base station its gain of the channel to the source and also its intercellular interference power received plus noise. The terminal j uplinks its gain of the channel toward the base station and its intercellular interference power received plus noise to the base station. The base station chooses the best relay for the terminal j from amongst the nodes that have uplinked their channel gain. The best relay is that which allows the maximum capacity to be attained according to the transmission protocol employed. If a capacity obtained thanks to the relay operation for the terminal j is greater than the capacity of the direct transmission, then the capacity with relay is considered for this terminal j. Otherwise, the capacity considered for the terminal j is that of the direct transmission. The base station saves the capacity C(j) for each terminal j in memory.

The base station serves the terminal that has the best capacity from amongst all the terminals of the cell, the transmission being potentially assisted by the relay associated with the selected terminal.

The invention claimed is:

1. A method for selecting at least one dynamic node, within a mobile network, as a candidate for relaying a data communication signal between a transmitter entity and a receiver entity of the network,
    comprising the steps:
        determining at least a first set of nodes of the network such that a signal communicated between one of the nodes of the first set and at least a first entity from between said transmitter and receiver entities undergoes an attenuation lower than a first predetermined threshold,
        limiting the selection of nodes as possible candidates for relaying the communication signal according to the content of said first set,
        wherein the method further comprises the steps:
        determining a signal attenuation between the transmitter entity and receiver entity,
        determining a second set of nodes such that a signal communicated between a node of the second set and the second entity from between said transmitter and receiver entities undergoes an attenuation lower than a threshold corresponding to said signal attenuation between the transmitter entity and the receiver entity,
        determining an intersection between the first set and a second set of nodes,
        limiting further the selection of nodes as possible candidates for relaying the communication signal to the nodes of said intersection of first and second sets, and
        establishing data communication between said transmitter and receiver entities using at least one relay node, said at least one relay node being limited to the nodes of said intersection of sets.

2. The method as claimed in claim 1, wherein, the mobile network being a cellular network comprising base stations serving terminals within cells of the network, the first entity is a terminal and the second entity is a base station.

3. The method as claimed in claim 2, wherein the first entity is a terminal and the second entity is a base station, in the two cases where:
    the data communication signal is transmitted from the base station and to the terminal, and
    the data communication signal is transmitted from the terminal and to the base station.

4. The method as claimed in claim 2, comprising the steps:
    determine an attenuation that a signal communicated between the terminal and the base station undergoes, and
    if the attenuation of said signal between the terminal and the base station is lower than a second predetermined threshold, decide on a direct transmission of the communication signal between the base station and the terminal, without making use of a relay.

5. The method as claimed in claim 1, wherein the mobile network being a cellular network comprising base stations serving terminals within cells of the network, the first entity and the second entity are terminals, and a signal communicated between the first entity and the base station undergoes an attenuation lower than a signal communicated between the second entity and the base station.

6. The method as claimed in claim 1, wherein the first threshold and/or the second threshold are chosen to be lower than an attenuation that a signal communicated directly between the transmitter and receiver entities undergoes.

7. The method as claimed in claim 2, wherein the terminals uplink to the base stations serving their cell information on a channel and/or on intercellular interference and noise,
    and in that the base station determines at least one terminal as a relay node from amongst the nodes of the intersection of sets, depending on information that the terminals uplink.

8. The method as claimed in claim 7, wherein the base station determines a sub-set comprising at least one terminal as a relay node supplying an optimum gain in transmission capacity, estimated as a function of said information that the terminals uplink.

9. The method as claimed in claim 1, wherein the nodes of the network transmit, to the transmitter entity and/or to the receiver entity, a test signal containing information allowing a signal attenuation to the transmitter entity and/or to the receiver entity, respectively, to be deduced.

10. A non-transitory memory storing computer program instructions for the implementation of the method as claimed in claim 1, when this program is executed by a processor.

11. A base station of a cellular network, comprising a processor for selection of at least one dynamic node of the network as a candidate for relaying a data communication signal between the base station and a terminal of the network, said processor being configured for:
    receiving from the terminal at least a first set of nodes such that a signal communicated between the terminal and a node of the first set undergoes an attenuation lower than a first predetermined threshold,
    determining an intersection between the first set and a second set of nodes such that a signal communicated between a node of the second set and the base station undergoes an attenuation lower than a threshold corresponding to a signal attenuation between the base station and the terminal, limiting the selection of nodes as possible candidates for relaying the communication signal to the nodes of said intersection of sets, and establishing data communication between said base station and said terminal using at least one relay node, said at least one relay node being limited to the nodes of said intersection of sets.

12. A terminal designed to transmit/receive a data communication signal within a mobile network, comprising a processor for selection of at least one dynamic node of the network as a candidate for relaying the data communication signal between said terminal and an entity of the network, said processor being configured for:

receiving from said entity at least a first set of nodes such that a signal communicated between said entity and a node of the first set undergoes an attenuation lower than a first predetermined threshold, determining an intersection between the first set and a second set of nodes of the network such that a signal communicated between a node of the second set and the terminal undergoes an attenuation lower than a threshold corresponding to a signal attenuation between the terminal and the entity, limiting the selection of nodes as possible candidates for relaying the communication signal to the of said intersection of sets, and establishing data communication between said terminal and said entity using at least one relay node, said at least one relay node being limited to the nodes of said intersection of sets.

13. A system comprising at least one terminal and one base station, designed for a cellular network, further comprising a processor for selection of at least one dynamic node of the network as a candidate for relaying a data communication signal between the base station and the terminal, said processor being configured for:

receiving at least a first set of nodes of the network such that a signal communicated between a node of the first set and at least an entity amongst the terminal and the base station undergoes an attenuation lower than a first predetermined threshold, determining an intersection between the first set and a second set of nodes such that a signal communicated between a node of the second set and an entity amongst the terminal and the base station undergoes an attenuation lower than a threshold corresponding to a signal attenuation between the base station and the terminal, limiting the selection of nodes as possible candidates for relaying the communication signal according to the nodes of said intersection of sets, and establishing data communication between said terminal and said base station using at least one relay node, said at least one relay node being limited to the nodes of said intersection of sets.

* * * * *